(12) United States Patent
Kim et al.

(10) Patent No.: US 10,182,372 B2
(45) Date of Patent: Jan. 15, 2019

(54) METHOD FOR TRANSMITTING D2D SIGNAL IN WIRELESS COMMUNICATION SYSTEM AND DEVICE THEREFOR

(71) Applicant: LG ELECTRONICS INC., Seoul (KR)

(72) Inventors: Youngtae Kim, Seoul (KR); Hanbyul Seo, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 15/121,887

(22) PCT Filed: Mar. 20, 2015

(86) PCT No.: PCT/KR2015/002736
§ 371 (c)(1),
(2) Date: Aug. 26, 2016

(87) PCT Pub. No.: WO2015/142109
PCT Pub. Date: Sep. 24, 2015

(65) Prior Publication Data
US 2017/0019813 A1 Jan. 19, 2017

Related U.S. Application Data

(60) Provisional application No. 61/968,343, filed on Mar. 20, 2014.

(51) Int. Cl.
*H04W 28/04* (2009.01)
*H04L 5/00* (2006.01)
(Continued)

(52) U.S. Cl.
CPC ........... *H04W 28/04* (2013.01); *H04L 5/0032* (2013.01); *H04L 5/0044* (2013.01);
(Continued)

(58) Field of Classification Search
None
See application file for complete search history.

(56) References Cited

U.S. PATENT DOCUMENTS

2017/0019813 A1  1/2017  Kim et al.

FOREIGN PATENT DOCUMENTS

| CN | 103327568 | 9/2013 |
|----|-----------|--------|
| CN | 103368713 | 10/2013 |

(Continued)

OTHER PUBLICATIONS

PCT International Application No. PCT/KR2015/002736, Written Opinion of the International Searching Authority dated Jun. 30, 2015, 19 pages.

(Continued)

*Primary Examiner* — Chi H Pham
*Assistant Examiner* — Raul Rivas
(74) *Attorney, Agent, or Firm* — Lee Hong Degerman Kang Waimey

(57) ABSTRACT

The present invention relates to a method and device for transmitting a device to device (D2D) signal by a first terminal in a wireless communication system. More particularly, the method comprises the steps of: setting a first resource pattern configured by at least one first resource unit and at least one second resource unit; transmitting a D2D signal in a first sub-frame corresponding to the first resource unit on a first resource area; and determining whether the first resource area of the first terminal collide with a second resource area of a second terminal by monitoring a D2D signal of the second terminal in a second sub-frame corresponding to the second resource unit on the first resource area, wherein the first resource pattern is different from a second resource pattern set by the second terminal in order to transmit the D2D signal.

10 Claims, 9 Drawing Sheets

(51) Int. Cl.
  *H04W 24/08* (2009.01)
  *H04W 72/04* (2009.01)
  *H04W 74/08* (2009.01)
  H04W 76/14 (2018.01)
  H04W 72/02 (2009.01)

(52) U.S. Cl.
  CPC ........... *H04L 5/0048* (2013.01); *H04W 24/08* (2013.01); *H04W 72/0446* (2013.01); *H04W 74/0825* (2013.01); *H04L 5/0073* (2013.01); *H04L 5/0078* (2013.01); *H04W 72/02* (2013.01); *H04W 76/14* (2018.02)

(56) References Cited

FOREIGN PATENT DOCUMENTS

| | | |
|---|---|---|
| CN | 103428817 | 12/2013 |
| WO | 2013062310 | 5/2013 |
| WO | 2013119094 | 8/2013 |
| WO | 2013191360 | 12/2013 |
| WO | 2014007446 | 1/2014 |
| WO | 2014010858 | 1/2014 |

OTHER PUBLICATIONS

The State Intellectual Property Office of the People's Republic of China Application Serial No. 201580015060.3, Office Action dated Nov. 2, 2018, 6 pages.

FIG. 2
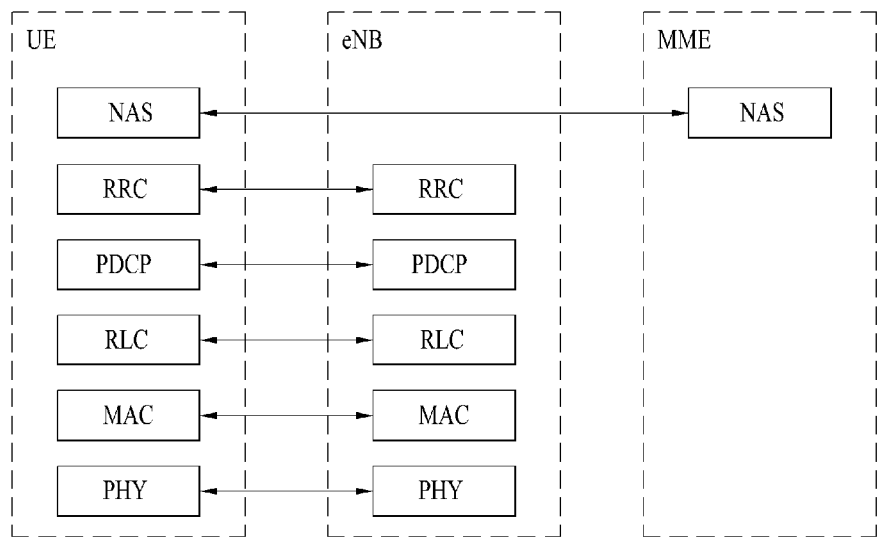
(a) Control-plane protocol stack
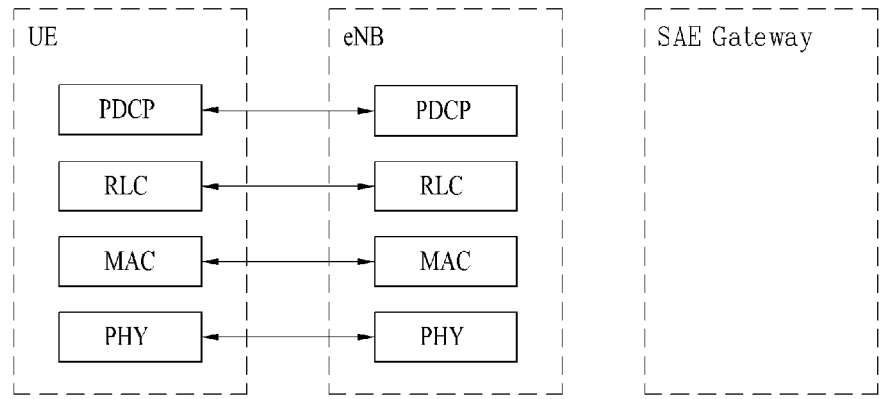
(b) User-plane protocol stack FIG. 6
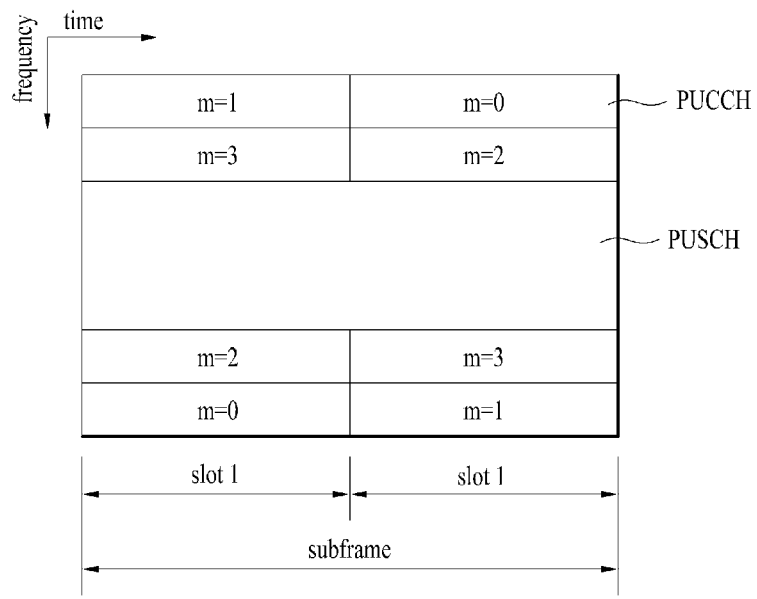
FIG. 7
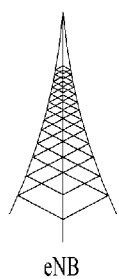
eNB

METHOD FOR TRANSMITTING D2D SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/002736, filed on Mar. 20, 2015, which claims the benefit of U.S. Provisional Application No. 61/968,343, filed on Mar. 20, 2014, the contents of which are all hereby incorporated by reference herein in their entirety.

TECHNICAL FIELD

The present invention relates to a wireless communication system, and more particularly, to a method of transmitting a D2D signal in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE OF THE INVENTION

Technical Task

Based on the aforementioned discussion, the present invention intends to propose a method of transmitting a D2D signal in a wireless communication system and an apparatus therefor in the following.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a D2D (device-to-device) signal, which is transmitted by a first terminal in a wireless communication system, includes the steps of setting a first resource pattern consisting of at least one of a first resource unit and a second resource unit in relation to the D2D signal transmitted by the first terminal, transmitting a D2D signal in a first subframe corresponding to the first resource unit of a first resource region based on the first resource pattern, and determining whether or not a collision occurs between a first resource region of the first terminal and a second resource region of a second terminal by monitoring a D2D signal of the second terminal in a second subframe corresponding to the second resource unit of the first resource region based on the first resource pattern. In this case, the first resource pattern may be different from a second resource pattern configured to transmit a D2D signal by the second terminal.

Preferably, the first resource unit may correspond to a resource unit configured to transmit the D2D signal and the second resource unit may correspond to a resource unit configured to receive the D2D signal of the second terminal.

Preferably, if the D2D signal of the second terminal is detected, the first resource region and the second resource region can be determined as being collided with each other. More preferably, the method can further include the step of reconfiguring the first resource pattern by comparing a first resource pattern number and a second resource pattern number with each other. Or, the D2D signal transmitted from the first resource region can be configured to be stopped.

Preferably, a sequence of a DM-RS (demodulation reference signal) of the first terminal can be generated based on the set first resource pattern.

Preferably, a scrambling sequence of data of the first terminal can be generated based on the set first resource pattern.

Preferably, the first resource pattern can be configured based on an identifier of the first terminal.

Preferably, the first resource pattern can be configured based on an identifier of the first terminal.

To further achieve these and other advantages and in accordance with the purpose of the present invention, according to a different embodiment, a first terminal transmitting a D2D (device-to-device) signal in a wireless communication system includes an RF (radio frequency) unit and a processor, the processor configured to set a first resource pattern consisting of at least one of a first resource unit and a second resource unit in relation to the D2D signal transmitted by the first terminal, the processor configured to transmit a D2D signal in a first subframe corresponding to the first resource unit of a first resource region based on the first resource pattern, the processor configured to determine whether or not a collision occurs between a first resource region of the first terminal and a second resource region of a second terminal by monitoring a D2D signal of the second terminal in a second subframe corresponding to the second resource unit of the first resource region based on the first resource pattern. In this case, the first resource pattern may be different from a second resource pattern configured to transmit a D2D signal by the second terminal.

Advantageous Effects

According to embodiments of the present invention, it is able to efficiently transmit a D2D signal in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

FIG. 6 is a diagram illustrating a structure of an uplink subframe used in an LTE system;

FIG. 7 is a diagram illustrating D2D communication;

BEST MODE

Mode for Invention

Figure 1:
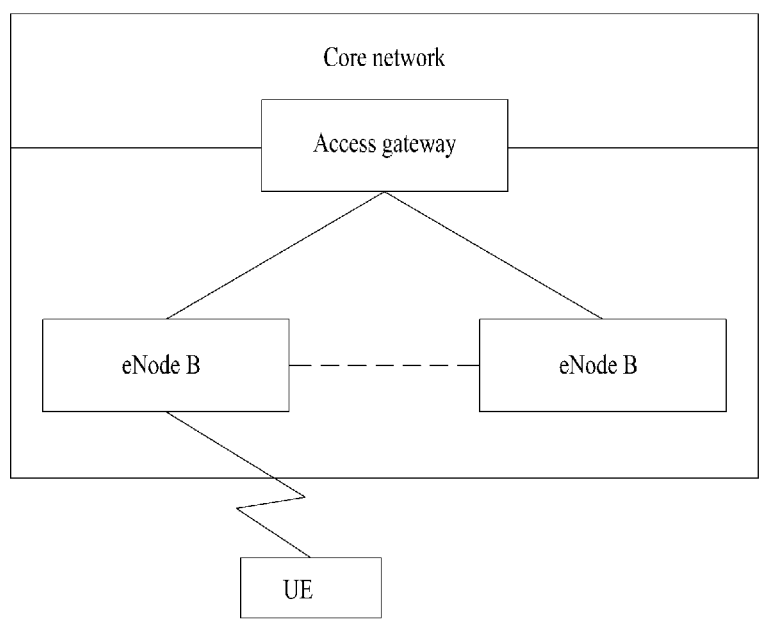
FIG. 1 is a schematic diagram of E-UMTS network structure as one example of a wireless communication system.

In the following, configuration, action and other characteristics of the present invention can be easily understood by embodiments of the present invention which are explained with reference to attached drawings. The embodiments explained in the following correspond to examples of which technological characteristics of the present invention are applied to 3GPP system.

In the present specification, although the embodiments of the present invention will be described based on the LTE and LTE-A system, the embodiments of the present invention can be applied to any communication system corresponding to the aforementioned definition. And, although the embodiments of the present invention will be described on the basis of the FDD scheme, the embodiments of the present invention can be applied to H-FDD scheme or TDD scheme in a manner of being easily modified.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
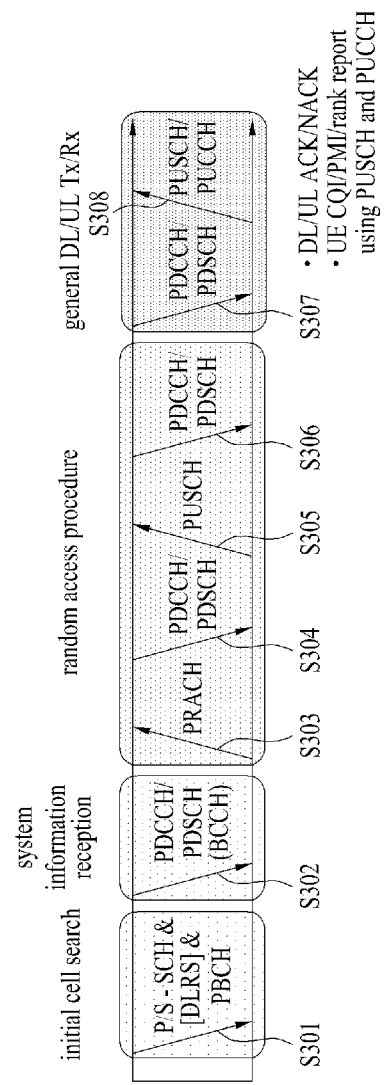
FIG. 3 is a diagram illustrating physical channels used in a 3GPP LTE system and a general method for transmitting a signal using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
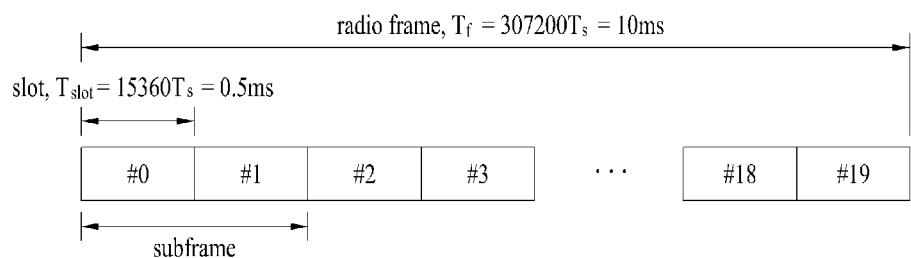
FIG. 4 is a diagram illustrating a structure of a radio frame used in an LTE system.

FIG. 4 is a diagram for a structure of a radio frame used in an LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s = 1/(15 \text{ kHz} \times 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
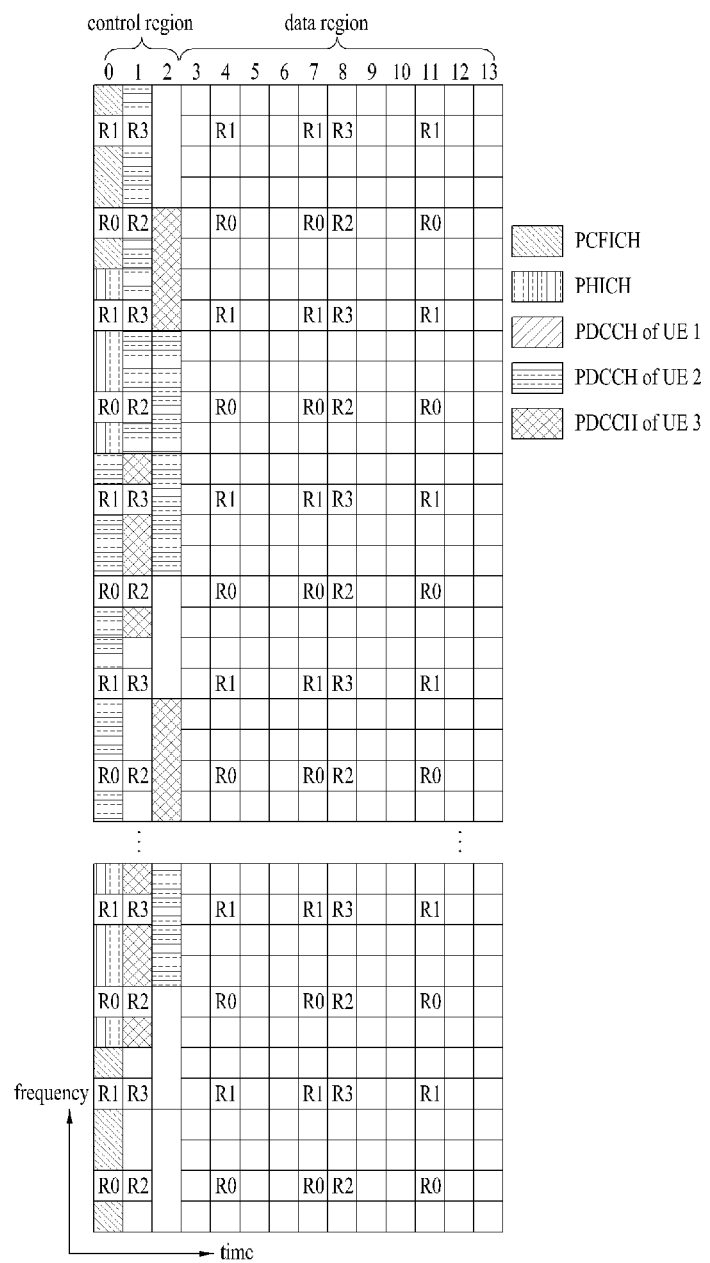
FIG. 5 is a diagram illustrating a structure of a downlink radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

In the following, the present invention is explained based on the aforementioned discussion. In the present invention, when a transmission UE allocates SA (scheduling assignment) to a resource region in D2D communication, a method of configuring a resource pattern capable of estimating whether or not collision occurs between transmission UEs is explained. For clarity, the present invention is explained centering on D2D communication, by which the present invention may be non-limited.

And, a resource region may correspond to a region consisting of time/frequency resources capable of transmitting a signal for D2D communication in the present invention. Although the present invention is explained centering on an uplink subframe for clarity, it is apparent that the present invention is applied to a radio resource capable of being used for D2D communication.

FIG. 7 shows D2D communication to which the present invention is applied.

In FIG. 7, data exchange between a first UE (UE 1) and a second UE (UE 2) can be performed without passing through a base station. A link directly established between devices can be referred to as a D2D link. D2D communication has merits that latency is reduced compared to a legacy base station-centered communication scheme and a less radio resource is required, and the like.

D2D communication corresponds to a scheme supporting communication between devices (UEs) without passing through a base station. Since the D2D communication is performed by reusing a resource of a legacy wireless communication system (e.g., 3GPP LTE/LTE-A), it is necessary not to make the legacy wireless communication system to be interfered or disturbed by the D2D communication. In the same vein, it is also important to minimize interference received by the D2D communication from a user equipment, a base station and the like operating in the legacy wireless communication system.

Moreover, in FIG. 7, although a UE corresponds to a terminal of a user, if such a network device as an eNB transmits and receives a signal according to a communication scheme between UEs, the network device can be considered as a sort of UEs and the present invention can be applied to the device.

In the following, a UE 1 selects a resource unit corresponding to a specific resource from a resource pool corresponding to a set of random resources and may be able to transmit a D2D signal using the resource unit. A UE 2 corresponding to a reception UE receives a configuration of the resource pool capable of transmitting the signal by the UE 1 and detects the signal of the UE 1 in the resource pool. In this case, if the UE 1 is located within a connection range of a base station, the base station can inform the UE 1 of the resource pool. If the UE 1 is located at the outside of the connection range of the base station, a different UE may inform the UE 1 of the resource pool or the resource pool can be determined by resources determined in advance.

Figure 8:
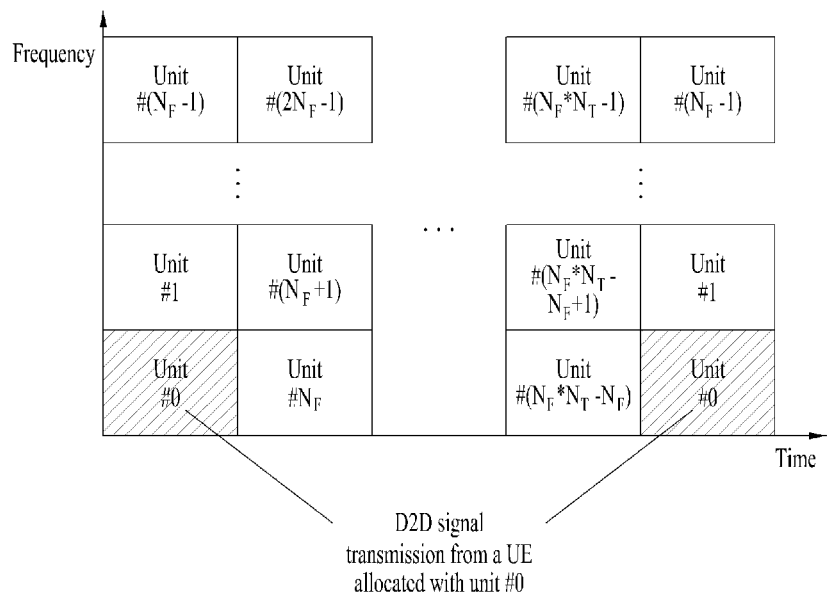
FIG. 8 explains a resource pool to which the present invention is applicable with reference to a resource pool to which the present invention is applicable.

A resource pool to which the present invention is applicable is explained with reference to FIG. 8 in the following. A resource pool consists of a plurality of resource units. Each UE selects one or a plurality of resource units and may be then able to use the selected resource unit(s) to transmit a D2D signal of the UE. FIG. 8 shows a case that the $N_F*N_T$ number of resource units in total are defined in a manner that the total frequency resources are divided into $N_F$ number of frequency resources and the total time resources are divided into $N_T$ number of time resources.

Referring to FIG. 8, it is able to see that a corresponding resource pool is repeated with a period of $N_T$ subframe. Specifically, as shown in FIG. 8, a resource unit can periodically and repeatedly appear. Or, in order to obtain diversity gain in time or frequency domain, an index of a physical resource unit to which a logical resource unit is mapped may change with a predetermined pattern according to time. In this resource unit structure, a resource pool may correspond to a set of resource units capable of being used by a UE intending to transmit a signal.

Moreover, a resource pool can be segmented into various types. In particular, the resource pool can be distinguished from each other according to content of a D2D signal transmitted from each resource pool. As an example, the content of the D2D signal can be distinguished from each other as follows. A separate resource pool can be configured in response to each D2D signal.

- SA (scheduling assignment): corresponds to a signal including information on a resource position used by each transmission UE for a D2D data channel to be transmitted and information on MCS (modulation and coding scheme), MIMO transmission scheme and the like necessary for demodulating a D2D data channel. The SA can be transmitted on an identical resource unit in a manner of being multiplexed with D2D data. In this case, an SA resource pool may correspond to a resource pool in which the SA is transmitted in a manner of being multiplexed with D2D data.
- D2D data channel: corresponds to a resource pool used by a transmission UE to transmit user data using a resource designated via SA. If it is possible to transmit SA and D2D data on an identical resource unit in a manner of multiplexing the SA and the D2D data together, a D2D data channel of which SA information is excluded can be transmitted only in a resource pool for the D2D data channel. In other word, a resource element (RE), which was used to transmit SA information on an individual resource unit within an SA resource pool, can also be used to transmit D2D data in a D2D data channel resource pool.
- Discovery message: corresponds to a resource pool for a message that enables a neighboring UE to discover a transmission UE. The transmission UE transmits such information as an ID of the transmission UE and the like to the neighboring UE.

In particular, although the aforementioned contents (SA, D2D data channel, discovery message) of the D2D signal are identical to each other, it may be able to use a different resource pool according to a transmission and reception property of the D2D signal. For example, an identical D2D data channel or a discovery message can be identified as a different resource pool according to i) a scheme of determining transmission timing of a D2D signal (e.g., whether a D2D signal is transmitted at the timing of receiving a synchronization reference signal or whether a D2D signal is transmitted at the timing of receiving the synchronization reference signal to which prescribed TA (timing advance) is applied, ii) a scheme of allocating a resource (e.g., whether an eNB designates a transmission resource of an individual signal to an individual transmission UE or whether an individual transmission UE randomly selects an individual signal transmission resource from a resource pool), iii) a signal format (e.g., the number of symbols occupied by a D2D signal in a subframe or the number of subframes used for transmitting a D2D signal).

According to the aforementioned contents, a UE (i.e., transmission UE) intending to transmit data via D2D selects an appropriate resource from an SA pool and transmits SA of the transmission UE. In this case, as a reference for selecting an SA resource, it may be able to preferentially select an SA resource interlocked with a resource that satisfies at least one of i) a resource not transmitting SA of a different UE and ii) a resource which is expected not to transmit data in a following subframe according to SA of a different UE. In addition, the transmission UE may select an SA resource interlocked with a data transmission resource of which an interference level is expected to be low.

In general, an SA resource pool is located prior to a D2D data channel resource pool. First of all, a reception UE attempts to detect SA. If the reception UE detects the existence of data necessary to be received by the reception UE, the reception UE performs data reception in a D2D data channel resource interlocked with the detected SA.

Figure 9:
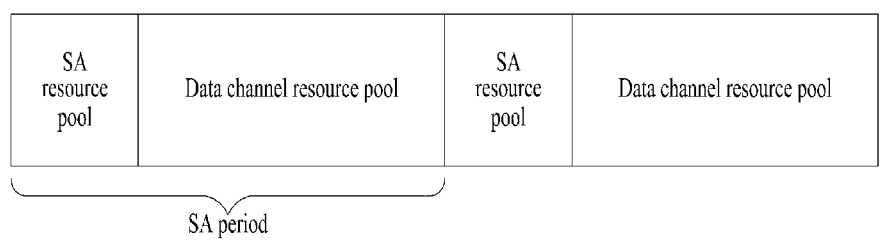
FIG. 9 is a diagram illustrating a case that an SA resource pool and a data channel resource pool are periodically appearing.

FIG. 9 is a diagram illustrating a case that an SA resource pool and a data channel resource pool are periodically appearing. In the present invention, assume that an SA resource pool appears prior to a data channel resource pool. In the following, as shown in FIG. 9, a period that the SA resource pool appears is defined as an SA period.

For clarity of explaining the present invention, a set of at least one or more resource units in a resource pool, which is designated in an SA pool to make a transmission UE transmit data, is referred to as a resource region. The resource region can be allocated in a manner of being distributed in various resource units in a data channel resource pool of an SA period shown in FIG. 9.

Figure 10:
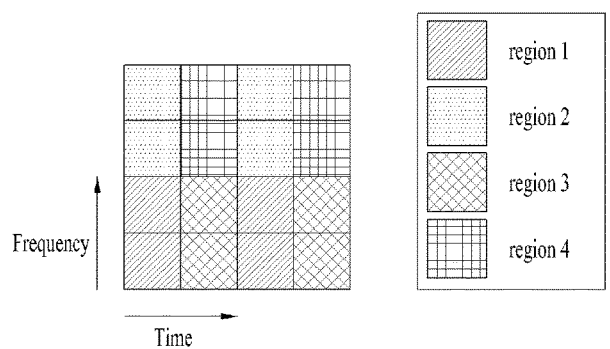
FIG. 10 is a diagram illustrating a data channel resource pool of an SA period consisting of 16 resource units.

FIG. 10 is a diagram illustrating a data channel resource pool of an SA period consisting of 16 resource units. For clarity, FIG. 10 shows a case that a data channel resource pool consisting of 4 resource regions, by which the present invention may be non-limited.

Moreover, since it is not easy for a base station to perform D2D to control (e.g., resource scheduling and the like) all transmission UEs, it is probable that a plurality of transmission UEs perform scheduling on an identical resource region in an SA pool. Hence, data of a plurality of the transmission UEs may mutually interfere with each other in the resource region scheduled by a plurality of the transmission UEs at the same time. And, due to half-duplex, it is difficult for a plurality of UEs performing scheduling on an identical resource region to determine whether or not interference occurs on the resource region.

Figure 11:
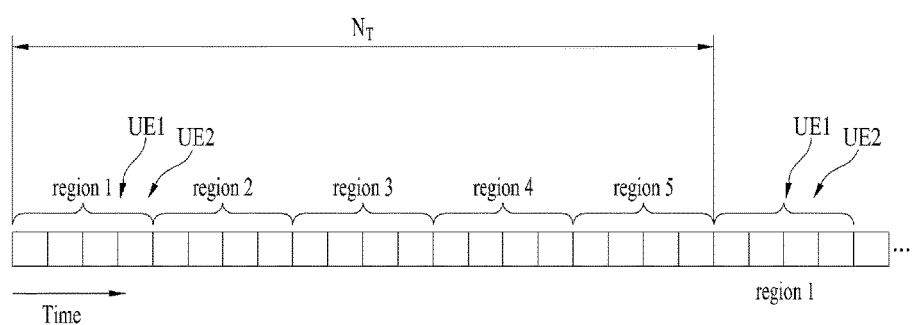
FIG. 11 is a diagram illustrating a data channel resource pool of a period consisting of one frequency unit and 16 time units.

FIG. 11 is a diagram illustrating a data channel resource pool of a period consisting of one frequency unit and 16 time units. A case that it is difficult for a plurality of UEs using an identical resource region to determine whether or not interference occurs on a resource region due to half-duplex is explained in the following with reference to FIG. 11. In this case, a period according to the present invention is defined as a length of a data channel resource pool existing between an SA pool and a next SA pool which is transmitted after the SA pool.

According to FIG. 11, first of all, a UE 1 and a UE 2 designate 4 resource units corresponding to a resource region 1 and transmit data. In this case, if it is assumed that the UE 1 and the UE 2 are in half-duplex incapable of performing transmission and reception at the same time, although the UE 1 and the UE 2 mutually cause interference, it is difficult to determine whether or not data causing the interference are collided with each other. Moreover, the UE 1 and the UE 2 may designate the resource region 1 at the same time in an SA pool after the collision. If the UE 1 or the UE 2 identifies whether or not the transmitted data are collided with each other, the UE 1 or the UE 2 may attempt to prevent collision in at least a next transmission after the collision.

Hence, the present invention proposes a method A to method C for making a plurality of UEs (hereinafter Tx UEs) recognize whether or not data transmitted by a plurality of the transmission UEs are collided with each other.

1. Method A

The method A proposed in the present invention is explained. When a Tx UE designates a resource region in an SA pool, a region at which data exists and a region at which data does not exist can be configured in a time axis of the designated resource region. In particular, it may be able to configure a plurality of resource patterns (of time axis) including the region at which data exists and the region at which data does not exist on the designated resource region. A transmission UE can use one of a plurality of the resource patterns.

Hence, in the method A, although a plurality of Tx UEs designate an identical resource region at the same time, each of a plurality of the Tx UEs can perform transmission with a different resource pattern. Hence, a Tx UE, which transmits a signal in a resource region at which collision occurs, switches to a reception mode (Rx mode) at the region at which data does not exist in the designated resource region and may be able to determine whether or not collision occurs. Similarly, other UEs, which transmit a signal in a resource region at which collision occurs, can also determine whether or not collision occurs via the reception mode (Rx mode) in the region at which data does not exist. Hence, the identified information (e.g., collision location) can be used as information for avoiding collision between transmission UEs in a next SA pool.

Figure 12:
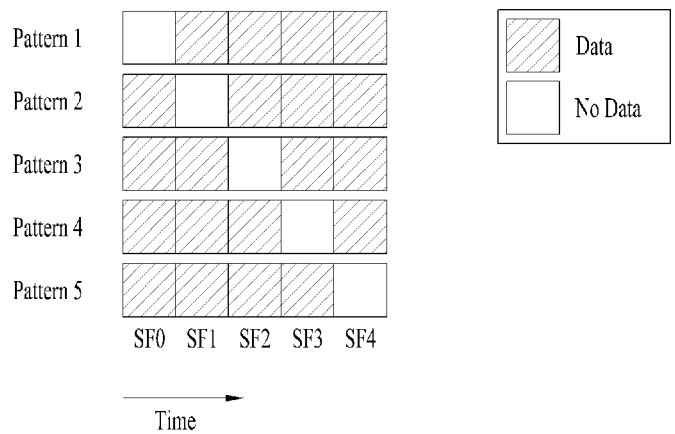
FIG. 12 is a diagram for explaining a method A according to one embodiment of the present invention.

FIG. 12 is a diagram for explaining the method A. In FIG. 12, assume that 4 subframes are configured as a resource region at which data exists and 1 subframe is configured as a resource region at which data does not exist. In this case, as shown in FIG. 12, it may have 5 resource patterns. Moreover, in FIG. 12, assume that a resource at which data exists is continuously allocated for clarity. In some cases, the present invention can also be applied to a case that a resource has a specific interval. Similarly, it is apparent that the present invention is applied to a case that each resource pattern is configured to be identified from each other.

In particular, in FIG. 12, if a UE 1 and a UE 2 are configured to use a pattern 1 and a pattern 4, respectively, although an identical resource region is used, data can be transmitted with a different pattern. Hence, the UE 1 switches to a reception mode (Rx mode) in a subframe #0 (i.e., SF0 in FIG. 12) and may be able to check a reception signal. In this case, since the UE 2 transmits data in the SF0, the UE 1 is able to recognize that collision occurs in a resource region designated by the UE 1. The UE 2 switches to a reception mode (Rx mode) in a subframe #3 (i.e., SF3 in FIG. 12) and may be able to check a reception signal. Similarly, since the UE 1 transmits data in the SF3, the UE 2 is able to recognize that collision occurs in a resource region designated by the UE 2. Hence, having recognized the collision information, the UE 1 and the UE 2 can newly designate a resource region for avoiding collision when a resource region is designated in an SA pool.

2. Method B

In the method B of the present invention, a method for a transmission UE to select a pattern is explained when a resource pattern is configured according to the aforementioned method A.

First of all, a transmission UE can randomly select a resource pattern. When the transmission UE randomly selects a resource pattern, it may be able to use at least one of i) a scheme of generating a DM-RS sequence of a transmission UE in consideration of information on a selected resource pattern and ii) a scheme of generating a scrambling sequence of data of the transmission UE in consideration of information on a selected resource pattern.

Moreover, when a transmission UE randomly selects a resource pattern, a reception UE can detect the selected resource pattern via blind detection.

Specifically, when information on the randomly selected resource pattern is defined as $n_P$ and the information is reflected to a scrambling sequence of a DM-RS, a different transmission UE checks the DM-RS in a time domain in which the different transmission UE does not perform transmission and may be able to detect the resource pattern information (i.e., $n_P$). When a specific parameter (e.g., cyclic shift) of a DM-RS has 1:1 relationship with a resource pattern and a specific UE is unable to receive SA of a different UE due to half-duplex, it may be able to identify a resource pattern used by the different UE using a DM-RS parameter only in a time domain in which the specific UE does not perform transmission on a designated resource region.

Hence, a transmission UE can determine a resource pattern to be used for next SA transmission in consideration of whether or not data transmitted by a different UE are collided with each other or a current resource traffic situation. In the aspect of a reception UE, since a parameter of a DM-RS is different from each other in an overlapped resource unit, although collision occurs, the reception UE can suppress interference. Hence, possibility of receiving at least one of a signal of the transmission UE and a signal of the different UE can be enhanced.

Or, when information on a randomly selected resource pattern is defined as $n_P$ and the information is reflected to generation of a scrambling sequence of data, a different transmission UE checks the data in a time domain in which the different transmission UE does not perform transmission and may be able to detect the resource pattern information (i.e., $n_P$). When a scrambling sequence of data is generated, if a specific parameter has 1:1 relationship with a resource pattern and a specific UE is unable to receive SA of a different UE due to half-duplex, it may be able to identify a resource pattern used by the different UE using a specific parameter only in a time domain in which the specific UE does not perform transmission on a designated resource region.

Hence, a transmission UE can determine a resource pattern to be used for next SA transmission in consideration of whether or not data transmitted by a different UE are collided with each other or a current resource traffic situation. In the aspect of a reception UE, since a parameter for generating a scrambling sequence of data is different from each other in an overlapped resource unit, although collision occurs, the reception UE can perform interference randomization.

Moreover, although a transmission UE randomly selects a resource pattern, it may be able to obtain all of the aforementioned effects by using information on the resource pattern for generating a scrambling sequence of a DM-RS and a scrambling sequence of data at the same time.

Secondly, a transmission UE can select a resource pattern according to an ID of the transmission UE. Moreover, in this case, it may be able to configure the resource pattern to be changed according to an SA pool. If the resource pattern is selected according to the ID of the transmission UE, it may be able to use at least one of i) a scheme of generating a DM-RS sequence of a transmission UE in consideration of information on a selected resource pattern or the ID of the transmission UE and ii) a scheme of generating a scrambling sequence of data of the transmission UE in consideration of information on a selected resource pattern or the ID of the transmission UE.

Moreover, when a transmission UE selects a resource pattern according to an ID of the transmission UE, a reception UE detects the ID of the transmission UE from an SA pool and may be then able to detect the selected resource pattern based on the ID of the transmission UE.

Specifically, when information on the resource pattern selected according to the ID of the transmission UE is defined as $n_P$ and the information is reflected to a scrambling sequence of a DM-RS, i) a different transmission UE checks the DM-RS in a time domain in which the different transmission UE does not perform transmission and may be able to detect the resource pattern information (i.e., $n_P$) or ii) the different transmission UE may detect the resource pattern information via the UE ID obtained from the SA pool and the information on the resource pattern.

When a specific parameter (e.g., cyclic shift) of a DM-RS has 1:1 relationship with a resource pattern and a specific UE is unable to receive SA of a different UE due to half-duplex, it may be able to identify a resource pattern used by the different UE using a DM-RS parameter only in a time domain in which the specific UE does not perform transmission on a designated resource region.

Hence, a transmission UE can determine a resource pattern to be used for next SA transmission in consideration of whether or not data transmitted by a different UE are collided with each other or a current resource traffic situation. In the aspect of a reception UE, since a parameter of a DM-RS is different from each other in an overlapped resource unit, although collision occurs, the reception UE can suppress interference. Hence, possibility of receiving at least one of a signal of the transmission UE and a signal of the different UE can be enhanced.

Or, when information on a resource pattern which is selected according to an ID of a transmission UE is defined as $n_P$ and the information is reflected to generation of a scrambling sequence of data, i) a different transmission UE checks the data in a time domain in which the different transmission UE does not perform transmission and may be able to detect the resource pattern information (i.e., $n_P$) or ii) the different transmission UE can detect resource pattern information via a UE ID obtained from an SA pool and the information on the resource pattern.

When a scrambling sequence of data is generated, if a specific parameter has 1:1 relationship with a resource pattern and a specific UE is unable to receive SA of a different UE due to half-duplex, it may be able to identify a resource pattern used by the different UE using a specific parameter only in a time domain in which the specific UE does not perform transmission on a designated resource region.

Hence, a transmission UE can determine a resource pattern to be used for next SA transmission in consideration of whether or not data transmitted by a different UE are collided with each other or a current resource traffic situation. In the aspect of a reception UE, since a parameter for generating a scrambling sequence of data is different from each other in an overlapped resource unit, although collision occurs, the reception UE can perform interference randomization.

Moreover, although a transmission UE selects a resource pattern according to an ID of the transmission UE, it may be able to obtain all of the aforementioned effects by using information on the resource pattern for generating a scrambling sequence of a DM-RS and a scrambling sequence of data at the same time.

3. Method C

In case of applying the resource pattern proposed by the method A of the present invention, a plurality of transmission UEs can recognize that a collision occurs in an identical resource region. In this case, it may be able to designate transmission UEs to continuously use a resource region at which the collision occurs in a next SA pool. Among the transmission UEs using the resource region at which the collision occurs, a reference for selecting a transmission UE configured to change the resource region, i.e., priority, can be defined in advance.

Specifically, in the method C, two methods for determining a transmission UE configured to continuously transmit a signal in a next SA pool in a resource region at which collision occurs are explained in the following.

Method C-1: Priority according to a pattern number of a resource used in a resource region at which collision occurs is defined in advance.

Method C-2: Priority is defined in advance according to an ID of a transmission UE in a resource region at which collision occurs.

First of all, one example of the method C-1 is explained in the following. Among resource pattern numbers of two or more UEs using an identical resource region, a transmission UE of a biggest resource pattern number can designate an identical resource region only in a next SA pool. The remaining transmission UEs can be configured to change a resource region in the next SA pool.

For example, assume that a UE 1 and a UE 2 use a pattern 1 and a pattern 4, respectively, shown in FIG. 12, in an identical resource region. In this case, if the method A is performed, the UE 1 is able to identify that a transmission UE uses at least one selected from the group consisting of a pattern 2, 3, 4, and 5 in an SF 0. Hence, the UE 1 can change a resource region in a next SA pool to transmit additional data according to the C-1 method designated in the aforementioned description.

Or, in some cases, since the UE 1 is already aware of whether or not a collision occurs with a signal of a different transmission UE in the SF 0, it is able to configure the UE 1 not to transmit data in the SF 1, an SF 2, an SF 3, and an SF 4. In particular, when a transmission UE knows that a collision occurs, if the transmission UE knows that priority of the transmission UE is not highest, the transmission UE may not transmit information in the remaining subframes in the resource region.

The UE 2 identifies that a pattern 0 is used in the SF 3 and can recognize that priority of the UE 2 is highest. Hence, the UE 2 can designate and use an identical resource region in a next SA pool.

The method C-1 is explained in detail in the following. Not only information on a resource pattern currently used by a transmission UE but also information on a different pattern transmitted in an identical resource region can be identified using a subframe in which data is not transmitted in the resource region. In this case, the information on the different pattern can be identified by the aforementioned method B. For example, if a resource pattern for a sequence used by a DM-RS is defined, transmission UEs are able to know a resource pattern at which a collision occurs used by other transmission UEs via the DM-RS. Or, if a resource pattern is reflected to a scrambling sequence of data, the transmission UEs are able to know a resource pattern at which a collision occurs used by other transmission UEs via the scrambling sequence applied to the data. Or, if a resource pattern is applied to both a sequence of a DM-RS and a scrambling sequence of data, it is able to find out a resource pattern at which a collision occurs used by other transmission UEs using the sequence of the DM-RS or the scrambling sequence of the data.

Subsequently, method C-2 is explained in the following. Among a plurality of UEs using an identical resource region, a transmission UE of a biggest UE ID can designate the same resource region only in a next SA pool. The rest of transmission UEs can be configured to change a resource region in the next SA pool.

In the method C-2, assume that a UE 1 (UE ID=1) and a UE 2 (UE ID=2) use a pattern 1 and a pattern 4, respectively, shown in FIG. 8, in an identical resource region. In this case, since the method 1 is used, the UE 1 checks an ID of a different transmission UE in an SF 0 and may be able to recognize that the UE 2 (UE ID=2) uses an identical resource region. Hence, according to the method C-2, the UE 1 can change a resource region in a next SA pool to transmit additional data.

Similar to the method C-1, since the UE 1 is already aware of whether or not a collision occurs with a signal of a different transmission UE in the SF 0, it is able to configure the UE 1 not to transmit data in the SF 1, an SF 2, an SF 3, and an SF 4. In particular, when a transmission UE knows that a collision occurs, if the transmission UE knows that priority of the transmission UE is not highest, the transmission UE may not transmit information in the remaining subframes in the resource region.

The UE 2 can identify that a UE of which a UE ID corresponds to 1 uses an identical resource region in the SF 3. Yet, since the UE 2 is able to recognize that priority of the UE 2 is highest, the UE 2 can designate and use an identical resource region in a next SA pool.

Moreover, according to the method C-2, a transmission UE is able to know not only information on a resource pattern currently used by the transmission UE but also information on an ID of a different UE transmitted in an identical resource region using a subframe in which data is not transmitted in the resource region. In this case, the ID of the different UE can be identified by the aforementioned method B. For example, if an ID of a UE is defined in a sequence used by a DM-RS, transmission UEs are able to know an ID of a UE used by other transmission UEs at which a collision occurs via the DM-RS. Or, if an ID of a UE is reflected to a scrambling sequence of data, transmission UEs are able to know an ID of a UE used by other transmission UEs at which a collision occurs via the scrambling sequence applied to the data. Or, if an ID of a UE is reflected to both a sequence of a DM-RS and a scrambling sequence of data, it may be able to find out an ID of a UE used by other transmission UEs at which a collision occurs using the sequence of the DM-RS or the scrambling sequence of the data.

Moreover, the method C for preventing a collision in a next SA pool can be performed based on probability. For example, in the method C-1, whether to continuously use an identical resource region in a next SA pool can be defined in advance by probability according to number of a resource pattern. And, if it is recognized as a collision occurs in a specific resource region, the rest of resource regions except the specific resource region are configured as candidates and it may be able to configure a resource region to be used in a next SA pool in consideration of probability of each of the candidates' resource regions. By doing so, it may be able to set a low probability of selecting a resource region relatively close to a resource region at which a collision occurs and set a high probability of selecting a resource region relatively far from a resource region at which a collision occurs. This is intended to reduce an impact capable of being occurred according to wireless environment.

And, according to the method C for preventing a collision in a next SA pool, it is necessary to find out information of a different transmission UE in a subframe in which data is not used in a resource region. In this case, although information on whether or not a collision occurs is found out, if it fails to find out information (e.g., UE ID) of a different transmission UE, it is able to configure a resource region to be changed in a next SA pool all the time. Or, it may be able to configure a resource region to be changed based on a predetermined probability.

Although the method A to the method C proposed by the present invention are explained centering on a data channel resource pool, it is apparent that the present invention is also applicable to an SA resource pool. In this case, the SA resource pool can designate a resource region in the data channel resource pool via a plurality of resources. Since the SA pool is able to know whether or not a collision occurs in the data channel resource pool, the SA pool can drop data in the data channel resource pool to avoid a collision or may change a resource region in the data channel resource pool to avoid a collision in a next SA pool.

Figure 13:
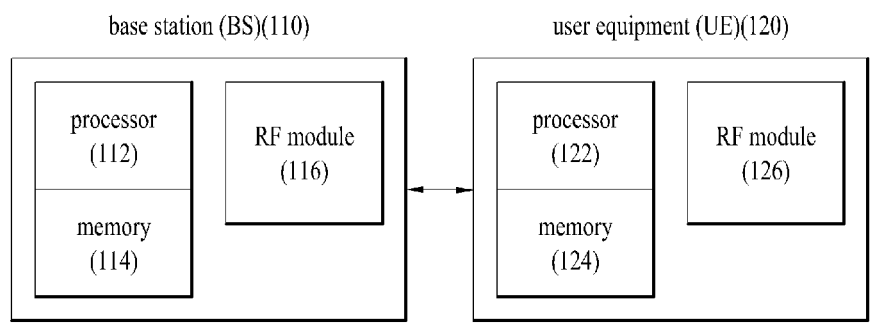
FIG. 13 is a diagram for a base station and a user equipment capable of being applied to one embodiment of the present invention.

FIG. 13 is a diagram for a base station and a user equipment capable of being applied to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 13, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method of transmitting a D2D signal in a wireless communication system and an apparatus therefor are described centering on examples applied to 3GPP LTE system, it may be applicable to various wireless communication systems as well as to the 3GPP LTE system.

What is claimed is:

1. A method of transmitting a D2D (device-to-device) signal, which is transmitted by a first terminal in a wireless communication system, comprising the steps of:
   setting a first resource pattern comprising a first resource unit and a second resource unit, the first resource pattern set based on a first resource pool to be used by the first terminal to transmit and receive D2D signals,
   wherein the first resource unit is used by the first terminal to transmit a D2D signal, and the second resource unit is used by the first terminal to receive a D2D signal;
   transmitting the D2D signal in a first subframe corresponding to the first resource unit;
   determining whether or not a collision occurs between the first resource pool of the first terminal and a second resource pool of a second terminal by monitoring a D2D signal of the second terminal in a second subframe corresponding to the second resource unit of the first resource pool,
   wherein the second resource pattern is set by the second terminal based on the second resource pool, the second resource pool used by the second terminal to transmit and receive D2D signals, and
   wherein the first resource pattern is different from a second resource pattern; and
   reconfiguring the first resource pattern by comparing a first resource pattern number of the first resource pattern and a second resource pattern number of the second resource pattern with each other, if the first resource pool and the second resource pool are determined as being collided with each other.

2. The method of claim 1, further comprising:
   if the first resource pool and the second resource pool are determined as being collided with each other, stopping the transmission of the D2D signal.

3. The method of claim 1, wherein a sequence of a DM-RS (demodulation reference signal) of the first terminal is generated based on the set first resource pattern.

4. The method of claim 1, wherein a scrambling sequence of data of the first terminal is generated based on the set first resource pattern.

5. The method of claim 1, wherein the second resource pattern is configured based on an identifier of the second terminal.

6. The method of claim 1, wherein the first resource pattern is configured based on an identifier of the first terminal.

7. A first terminal transmitting a D2D (device-to-device) signal in a wireless communication system, comprising:
   an RF (radio frequency) unit including a transceiver; and
   a processor, the processor configured to:
      set a first resource pattern comprising a first resource unit and a second resource unit, the first resource pattern set based on a first resource pool to be used by the first terminal to transmit and receive D2D signals,
      wherein the first resource unit is used by the first terminal to transmit a D2D signal, and the second resource unit is used by the first terminal to receive a D2D signal,
      transmit the D2D signal in a first subframe corresponding to the first resource unit of the first resource pool based on the first resource pattern,
      determine whether or not a collision occurs between the first resource pool of the first terminal and a second resource pool of a second terminal by monitoring a D2D signal of the second terminal in a second subframe corresponding to the second resource unit of the first resource pool, wherein the second resource pattern is set by the second terminal based on the second resource pool, the second resource pool used by the second terminal to transmit and receive D2D signals, and wherein the first resource pattern is different from a second resource pattern; and reconfigure the first resource pattern by comparing a first resource pattern number of the first resource pattern and a second resource pattern number of the second resource pattern with each other, if the first resource pool and the second resource pool are determined as being collided with each other.

8. The method of claim 1, wherein the reconfiguring the first resource pattern comprises:

changing from the first resource pattern to another resource pattern to avoid a collision between the first resource pool and the second resource pool.

9. The first terminal of claim 7, wherein if the first resource pool and the second resource pool are determined as being collided with each other, the processor is configured to stop transmitting the D2D signal.

10. The first terminal of claim 7, wherein the processor is configured to change from the first resource pattern to another resource pattern to avoid a collision between the first resource pool and the second resource pool.

* * * * *